United States Patent
Daniels

(10) Patent No.: US 10,557,319 B2
(45) Date of Patent: Feb. 11, 2020

(54) WEDGED CAMP ASSEMBLY

(71) Applicant: Micheal Allen Daniels, Altamont, UT (US)

(72) Inventor: Micheal Allen Daniels, Altamont, UT (US)

( * ) Notice: Subject to any disclaimer, the term of this patent is extended or adjusted under 35 U.S.C. 154(b) by 143 days.

(21) Appl. No.: 15/683,055

(22) Filed: Aug. 22, 2017

(65) Prior Publication Data

US 2019/0063166 A1 Feb. 28, 2019

(51) Int. Cl.
*E21B 19/10* (2006.01)
*F16B 2/06* (2006.01)

(52) U.S. Cl.
CPC .............. *E21B 19/10* (2013.01); *F16B 2/065* (2013.01)

(58) Field of Classification Search
USPC ............ 248/534, 539, 541, 49, 65, 73, 74.3
See application file for complete search history.

(56) References Cited

U.S. PATENT DOCUMENTS

| | | | |
|---|---|---|---|
| 1,460,256 A | 6/1923 | Lefler | |
| 1,703,201 A | 2/1929 | Melat | |
| 1,778,266 A | 10/1930 | Martin | |
| 2,854,723 A * | 10/1958 | Clapper | B60N 2/38 24/326 |
| 3,472,535 A * | 10/1969 | Kinley | E21B 19/10 188/67 |
| 4,589,483 A | 5/1986 | Sable | |
| 4,852,840 A * | 8/1989 | Marks | F16B 2/065 248/230.4 |
| 5,024,404 A * | 6/1991 | Ballard | A62C 35/68 24/268 |
| 5,335,756 A * | 8/1994 | Penisson | E21B 19/10 188/67 |
| 5,395,079 A * | 3/1995 | Jensen | F16L 3/10 248/62 |
| 5,431,459 A * | 7/1995 | Gundy | F16L 41/002 24/268 |
| 6,378,399 B1 * | 4/2002 | Bangert | E21B 19/07 294/102.2 |
| 6,517,122 B1 * | 2/2003 | Minemyer | F16L 17/04 285/328 |
| 6,640,939 B2 * | 11/2003 | Buck | E21B 19/10 166/77.53 |
| 6,708,703 B1 * | 3/2004 | Rivers | A45B 11/00 135/16 |
| 6,845,814 B2 * | 1/2005 | Mason | E21B 19/10 166/75.14 |
| 7,036,397 B2 * | 5/2006 | Bangert | E21B 19/07 81/57.15 |
| 7,686,088 B2 * | 3/2010 | Shahin | E21B 19/07 166/382 |
| 9,181,763 B2 | 11/2015 | McIntosh et al. | |

(Continued)

*Primary Examiner* — Monica E Millner
(74) *Attorney, Agent, or Firm* — Oliff PLC

(57) ABSTRACT

A clamp assembly for supporting a rod includes a housing that includes a base, wings extending from the base, and lips extending from the wings to define a rod-receiving slot between the lips. A door engages with the lips, and the housing and door are shaped such that downward movement of the door with respect to the housing causes the door to be forced closer to the base of the housing. A wedge is attached to the door, and wedgedly contacts the rod as the door is forced downward with respect to the housing.

19 Claims, 6 Drawing Sheets

(56) References Cited

U.S. PATENT DOCUMENTS

| | | | | |
|---|---|---|---|---|
| 2004/0094674 A1* | 5/2004 | Bozmoski | ........... | F01N 13/1805 |
| | | | | 248/58 |
| 2007/0209804 A1* | 9/2007 | Webre | ................... | E21B 17/026 |
| | | | | 166/379 |
| 2008/0216999 A1* | 9/2008 | Halse | ...................... | E21B 19/10 |
| | | | | 166/75.14 |
| 2015/0107857 A1* | 4/2015 | Mosing | ................... | E21B 19/07 |
| | | | | 166/382 |
| 2017/0167646 A1* | 6/2017 | Chiproot | ............... | F16L 55/178 |

\* cited by examiner

WEDGED CAMP ASSEMBLY

BACKGROUND

In a conventional oil pumping rig, a polish rod is attached to a string of rods joined end to end below. The polish rod is suspended from a pumping rig, and moved up and down to operate the pumping mechanism down in the well in order to cause oil to flow upward out of the well. The polish rod passes through a carrier block and a rod rotator, and a clamp is attached to the polish rod above the rod rotator to prevent the polish rod from falling down into the well. Conventional clamps are of a clamshell construction, with two halves, hinged together, that surround the polish rod and are held together by bolts and nuts.

SUMMARY

A wedged clamp assembly according to this disclosure includes a housing that includes a base, wings extending from the base, and lips extending from the wings to define a rod-receiving slot between the lips. A door engages with the lips, and the housing and door are shaped such that downward movement of the door with respect to the housing causes the door to be forced closer to the base of the housing. A wedge is attached to the door, and wedgedly contacts the rod as the door is forced downward with respect to the housing.

BRIEF DESCRIPTION OF THE DRAWINGS

Exemplary embodiments will be described below with reference to the drawings, wherein like numerals represent like parts, and wherein.

DETAILED DESCRIPTION OF EMBODIMENTS

Figure 1:
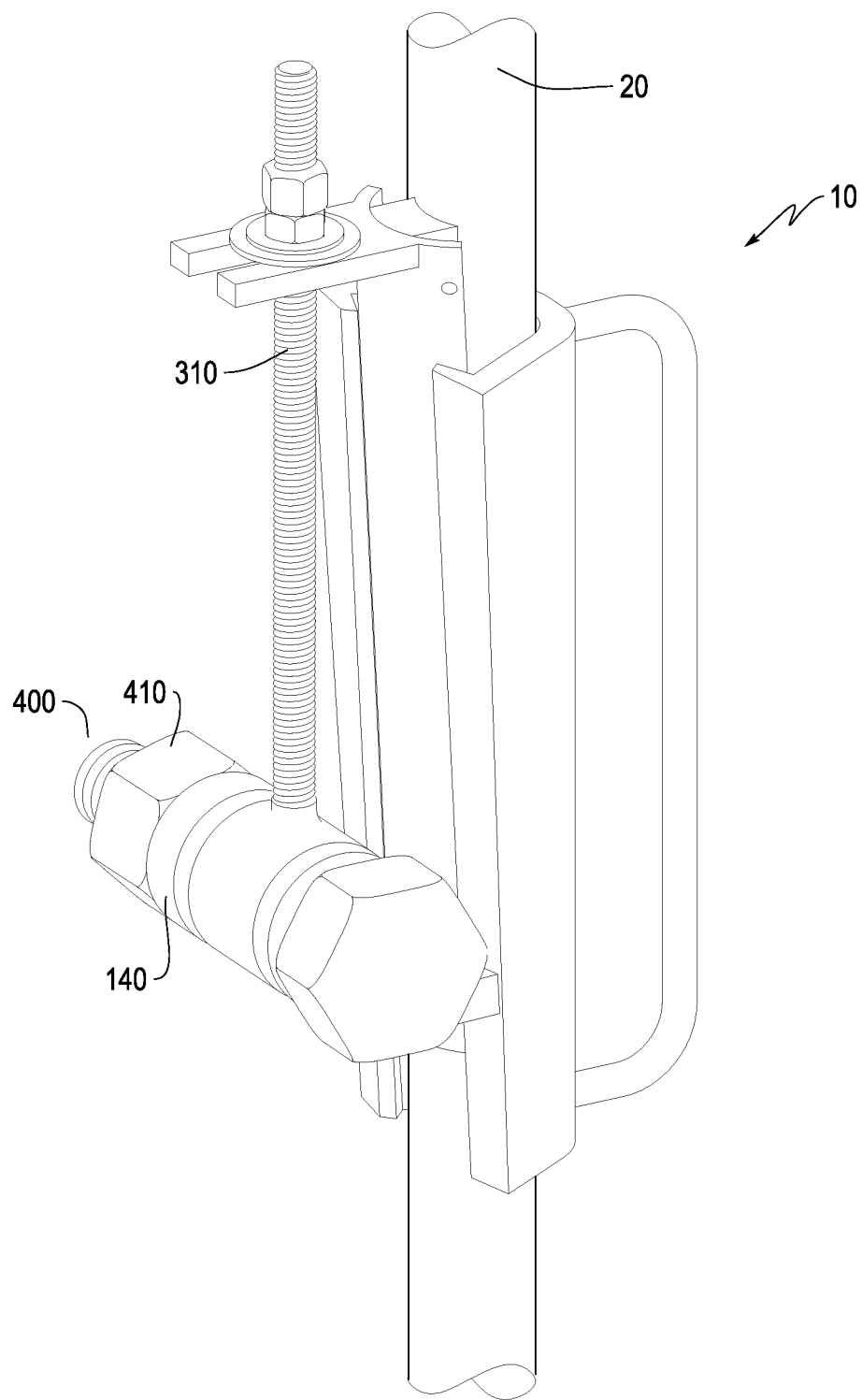
FIG. 1 is a perspective view of a wedged clamp assembly attached to a rod.
Figure 2:
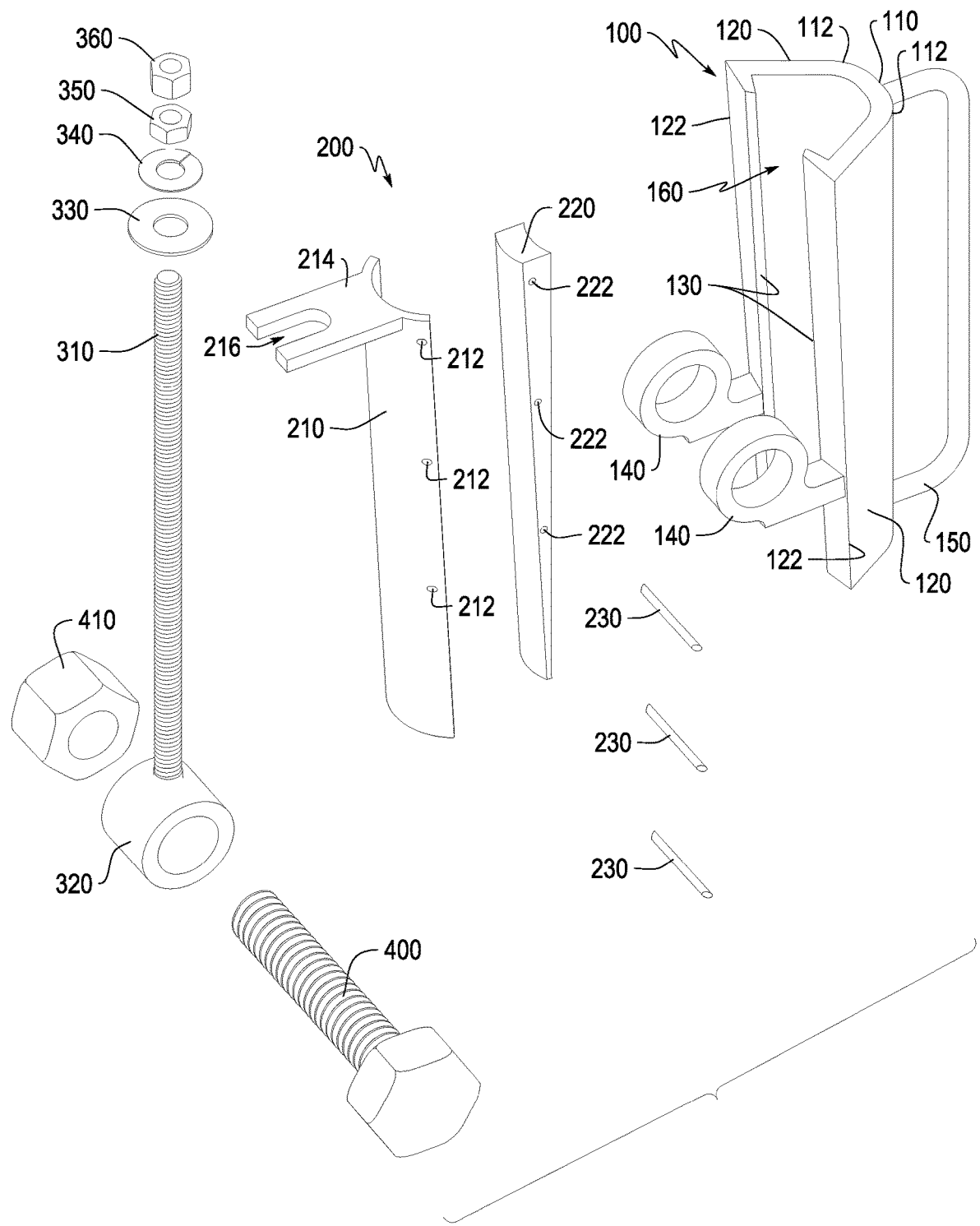
FIG. 2 is a blown apart perspective view of a wedged clamp assembly.

As shown in FIGS. 1 and 2, a wedged clamp assembly 10 is attachable to a rod 20. In this embodiment, the rod 20 is a polish rod of an oil well pumping rig (described in more detail hereafter). The clamp assembly 10 includes a housing 100, a door 200 and a retainer 300.

The housing 100 includes a base 110, which may be rounded so as to be concave in an inward-facing direction. Wings 120 extend from rear corners 112 of the base 110, such that the smallest angle defined between each wing 120 and the base 110 is an obtuse angle.

At front corners 122 of the wings 120, lips 130 protrude in directions such that the lips 130 converge toward each other. The front corners 122 taper toward the bottom of the clamp assembly 10, such that the front corners 122 are not parallel to the rear corners 112. The front corners 122, and/or inward-facing edges of the lips 130, may be parallel to each other.

A rod-receiving slot 160 is defined between the lips 130. The housing 100 may be placed around the rod 20 from the side by aligning the rod 20 with the rod-receiving slot 160 and pushing the housing 100 sideways until the rod 20 reached the inner surface of the base 110.

The base 110, the wings 120 and the lips 130 may be formed of metal, such as steel. The base 110, the wings 120 and the lips 130 may be formed together as a unitary piece, e.g., by being machined to remove material from a single block of steel, or may be formed as separate pieces and then connected together by welding or other methods.

A handle 150 may be provided, and in the embodiments shown, the handle 150 protrudes outward from the base 110. The handle 150 may be connected to the base 110 by welding or the like.

The door 200 includes a door base 210. A wedge 220 is attached to the door base 210. The wedge 220 may be of a material that is different from that of the door base 210. For example, the wedge 220 may be of brass, and the door base 210 may be of steel. Thus, the wedge 220 may have a lower hardness than that of the door base 210 and/or the housing 100. This can help avoid marring of the surface of the rod 20 when the wedge 220 is driven downward against the rod 20.

The wedge 220 may be attached to the door base 210 by any desired method, including welding, brazing, or the like, but in the embodiments depicted, the wedge 220 is removably attached to the door base 210 by wedge retainer pins 230 that pass through retainer pin holes 212 in the door base 210 and corresponding retainer pin holes 222 in the wedge 220. "Removably attached," as used herein, means attached in a way that allows the wedge 220 to be removed from the door base 210 without damaging either the wedge 220 or the door base 210. For example, if wedge 220 were welded or brazed to the door base 210, the wedge 220 could not be removed from the door base 210 without cutting the weld material or brazing material with a cutting wheel or the like, which would likely damage the wedge 220 and/or the door base 210. In contrast, with the wedge retainer pins 230, the wedge 220 can be removed from the door base 210 without damaging either the wedge 220 or the door base 210, by driving out the wedge retainer pins 230 with a punch or the like.

The wedge retainer pins 230 may have tapered ends, as shown, so that when positioned in the retainer pin holes 212, the wedge retainer pins 230 do not protrude beyond outer surfaces of the door base 210. Alternatively, the wedge retainer pins 230 may have lengths such they are recessed within the retainer pin holes 212.

The door base 210 may have an inwardly convex shape, as shown in FIGS. 1 and 2. The door base 210 is sized such that side edges of the door base 210 can engage the lips 130 of the housing 100, as shown in the drawings, each side edge of the door base 210 being between the rod 20 and a corresponding one of the lips 130. The side edges of the door base 210 may be substantially parallel to each other, or may be slightly tapered so as to converge toward each other in the downward direction.

An outer surface of the wedge 220, i.e., the surface contacting the door base 210, may have a convex shape so as to match the shape of the inner surface of the door base 210. An inner surface of the wedge 220, i.e., the surface contacting the rod 20, may have a concave shape. The concave shape of the inner surface of the wedge 220 may match the convex shape of the rod 20. Alternatively, the concave shape of the inner surface of the wedge 220 may have a larger radius of curvature than that of the convex shape of the rod 20.

A protrusion 214 protrudes from an upper end of the door base 210. A retainer bolt slot 216 is formed in the protrusion 214.

Retainer bolt connecting rings 140 protrude from the wings 120 and/or the lips 130. The retainer bolt connecting rings 140 may be of steel, and may be attached to the wings 120 and/or the lips 130 by welding, for example. A door retainer bolt 310 is attached to a bushing 320, and the bushing 320 is connected to the retainer bolt connecting rings 140 by, for example, a bolt 400 and nut 410. When the nut 410 is tightened on the bolt 400, pressure is exerted on outer faces of the retainer bolt connecting rings 140 by the head of the bolt 400 and the nut 410, respectively. This pressure helps avoid undesired spreading apart of the retainer bolt connecting rings 140, which could result in undesired widening of the rod-receiving slot 160. Through this connection, the door retainer bolt 310 is attached to, and pivotable with respect to, the housing 100.

Figure 3:
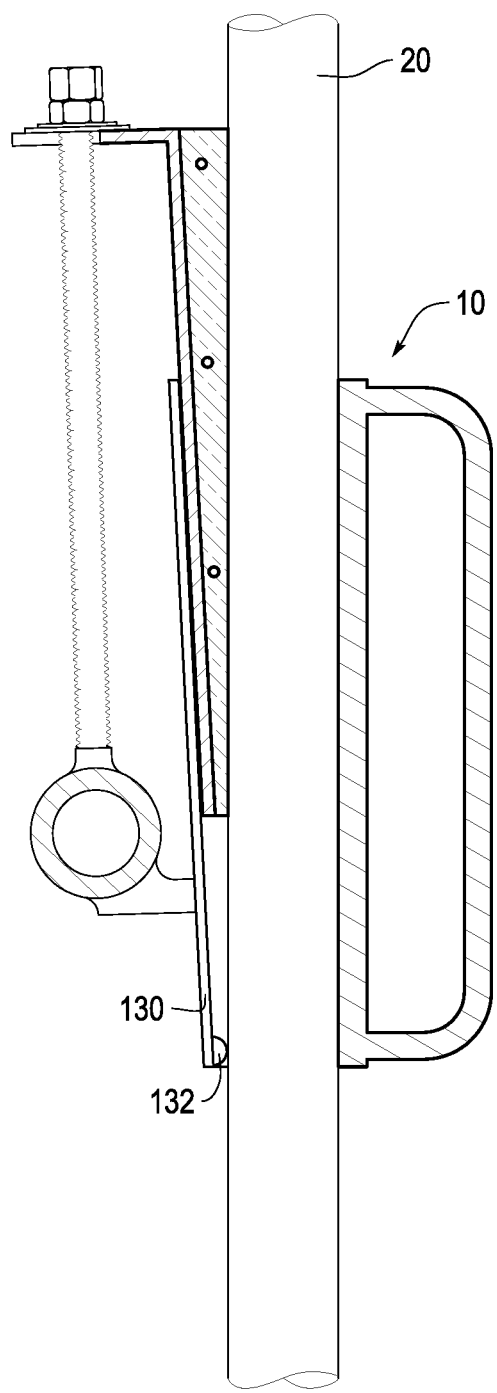
FIG. 3 is a cross sectional view of the wedged clamp assembly of FIG. 1, taken through its vertical plane of symmetry, attached to a rod.
Figure 4:
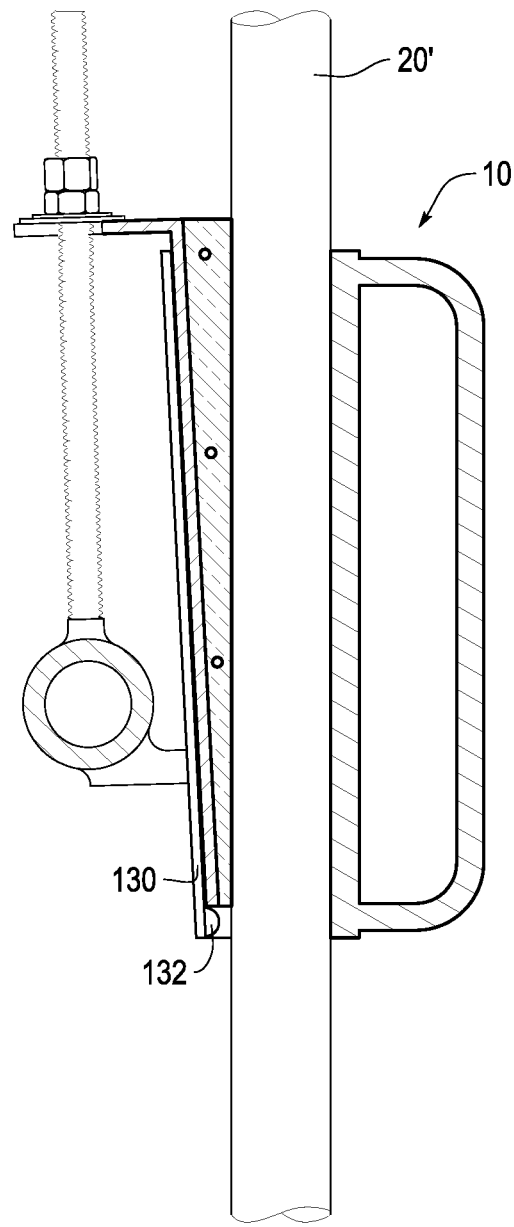
FIG. 4 is a cross sectional view of the wedged clamp assembly of FIG. 1, taken through its vertical plane of symmetry, attached to a rod of smaller diameter than that in FIG. 3.

In use, after the door 200 is inserted into the housing 100 with the wedge 220 placed against the rod 20, the door retainer bolt 310 is caused to pivot about the pin 400 until an upper end of the bolt enters the retainer bolt slot 216. The door 200 may be wedgedly driven downward by tightening a first nut 350 against the protrusion 216, as shown in FIGS. 3 and 4. A flat washer 330 and/or a lock washer 340 may be positioned between the protrusion 214 and the first nut 350. A second nut 360 may be tightened against the first nut 350, to lock the first nut 350 in place.

As shown in FIGS. 3-4, a stop 132 is provided at an inside surface of one of the lips 130, at a lower end of the housing 100. Although not depicted in the drawings, the other lip 130 may also have a stop 132 provided at its lower end. The door 200 is prevented by the stops 132 from going beyond the bottom end of the housing 100.

The wedged clamp assembly 10 may be designed for a single diameter of rod 20 or 20', or may be designed to accommodate rods of different diameters. In the case of being designed for a single diameter of rod 20 or 20', the concave shape of the inner surface of the wedge 220 may precisely match the shape of the circumference of the rod 20 or 20'. Additionally, an inner concave surface of the base 110 of the housing 100 may also have a shape that precisely matches the shape of the circumference of the rod 20 or 20'. In the case of being designed to accommodate rods of different diameters, the concave shape of the inner surface of the wedge 220 may have a larger radius of curvature than that of the circumference of a smaller-diameter rod 20' to be accommodated. Similarly, an inner concave surface of the base 110 of the housing 100 may also have a shape with a larger radius of curvature than that of the circumference of a smaller-diameter rod 20' to be accommodated.

As mentioned above, the wedge 220 may be removable from the door base 210. This provides the advantages that (i) the wedge 220 may be replaced if it becomes worn, and (ii) separate wedges 220 may be provided, each with a different radius of curvature in its inner concave surface, matching a circumference of a respective size of rod 20 or 20', to allow the clamp assembly to more precisely accommodate rods of different diameters. Exemplary rod diameters that may be accommodated may include, for example, ⅞", 1", 1¼", 1½", 1¾", 1⅞", and 2".

Figure 5:
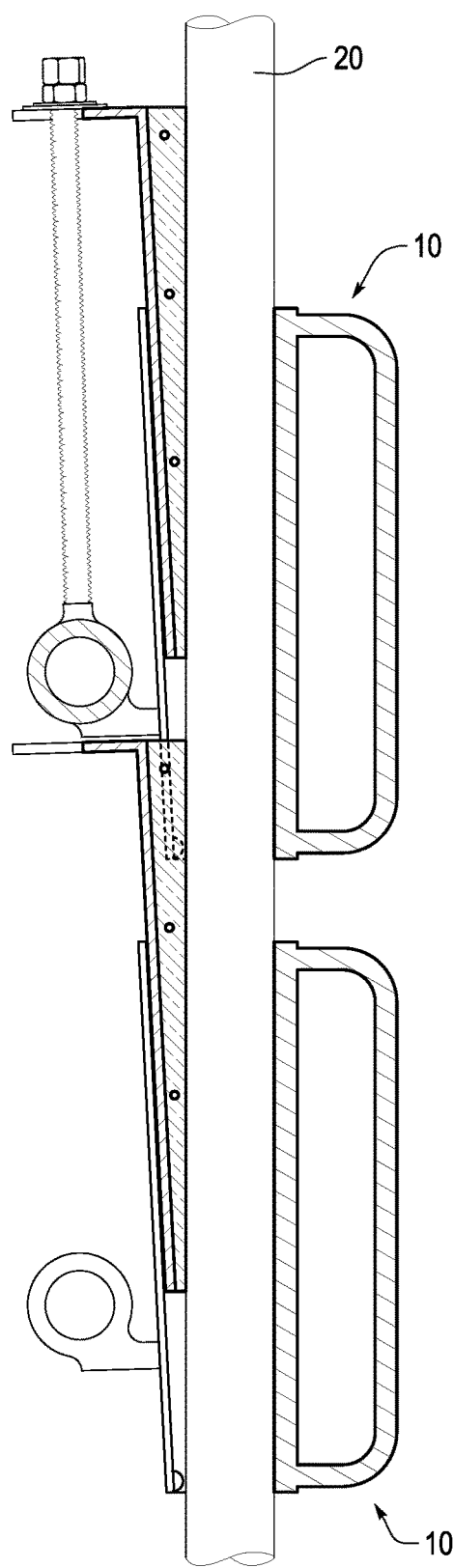
FIG. 5 is a cross sectional view of two wedged clamp assemblies of FIG. 1, taken through their vertical plane of symmetry, attached to a rod.
Figure 6:
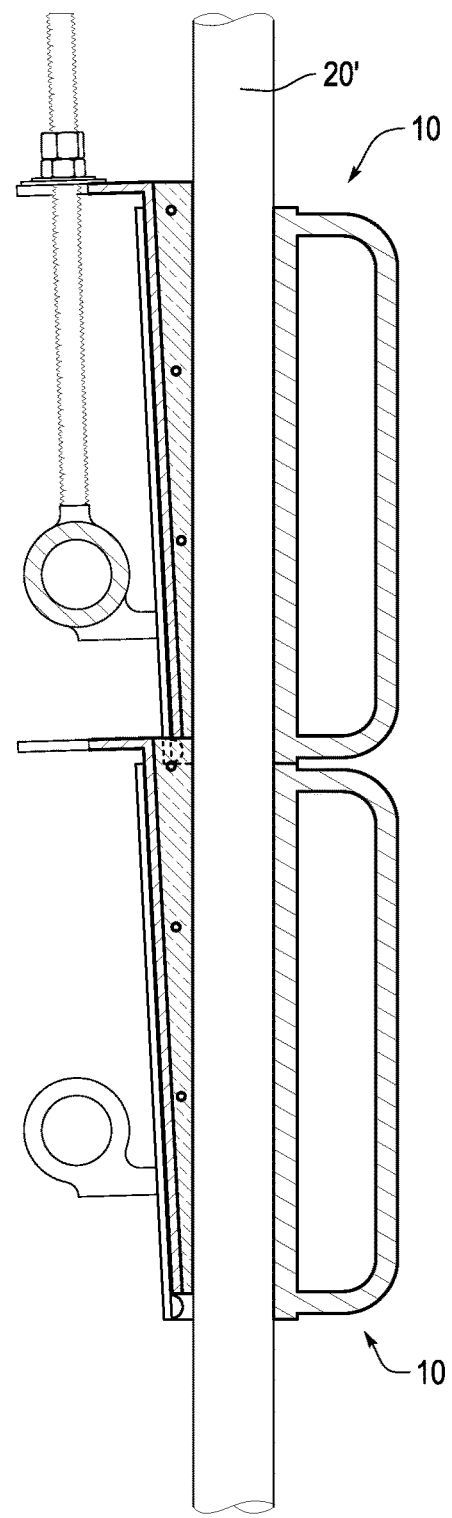
FIG. 6 is a cross sectional view of two wedged clamp assemblies of FIG. 1, taken through their vertical plane of symmetry, attached to a rod of smaller diameter than that in FIG. 5.

As shown in FIGS. 5 and 6, a double clamp configuration may be used in which two clamp assemblies 10 are used on a single rod 20 or 20', one above the other. In this case, the retainer bolt 310 of the lower clamp assembly 10 may be removed, or pivoted outward, so as not to interfere with the upper clamp assembly 10. However, it is preferable that the bolt 400 and nut 410 be in place in the bottom clamp assembly during operation, to help avoid unwanted spreading apart of the retainer bolt connecting rings 140, which could result in undesired widening of the rod-receiving slot 160, as described above. It may be preferable to simply pivot the retainer bolt 310 outward, rather than to remove it entirely, so that the pressure of bolt 400 and nut 410 on the outer faces of the retainer bolt connecting rings 140 does not need to be released (or at least, does not need to be released entirely). By using two (or more) clamp assemblies 10, one clamp assembly acts as a backup in case the other one fails. This improves the reliability of operation, and, for example, helps avoid the very costly occurrence of a pump rod being accidentally dropped down a well shaft.

When the double clamp configuration of FIG. 5 or 6 is used, the door 200 of bottom clamp assembly 10 may be forced downward by the bolt 310 and nut 350, prior to removal of pivoting outward of the retainer bolt 310.

Figure 7:
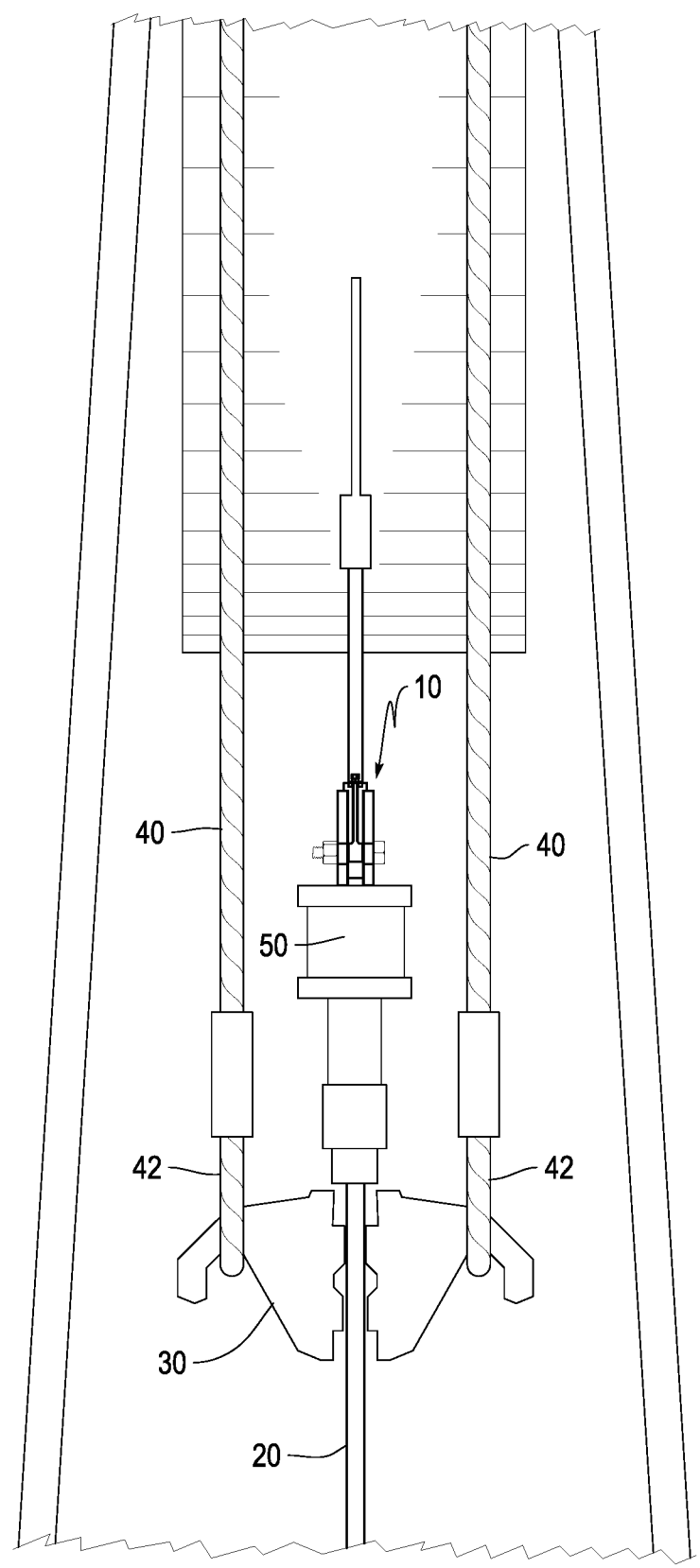
FIG. 7 shows a clamp assembly in use in the context of an oil well pumping rig.

FIG. 7 shows a clamp assembly 10 in use in the context of an oil well pumping rig. The polish rod 20 is attached to a string of rods (not depicted) joined end to end below, which may extend as far as 12,000 feet or more down an oil well, passes through a carrier block 30 and a rod rotator 50. The carrier block 30 is suspended from the pumping rig by cables 40. Loops 42 in the cable 42 may be passed over ears of the carrier block 30, as shown. The carrier block 30 is caused to move up and down, which causes the polish rod 20, and rod string below, to also move up and down and operate a pump device in a known manner. The rod rotator 50 causes the polish rod 20 to rotate during operation, to help reduce uneven wearing on the rod string below.

Figure 8:
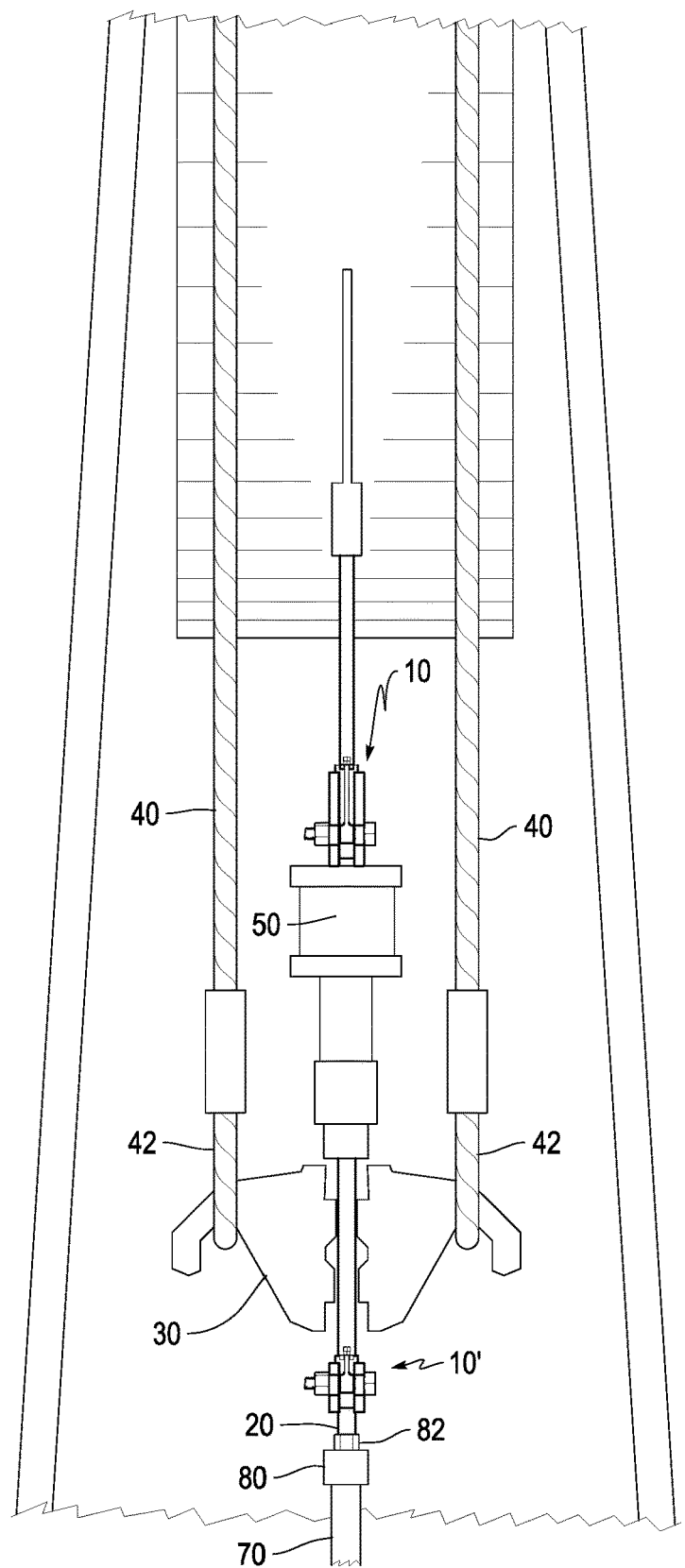
FIG. 8 shows a clamp assembly and half-clamp assembly in use in the context of an oil well pumping rig.

FIG. 8 shows a clamp assembly 10 and a half-clamp assembly 10' in use in the context of an oil well pumping rig. This embodiment is similar to that shown in FIG. 7, except that in FIG. 8, a half-clamp assembly 10' is attached to the polish rod 20 at a location below the carrier bar 30. The half-clamp assembly 10' is so named because it is approximately half the height of the clamp assembly 10, but otherwise may have a structure as described above in connection with the clamp assembly 10. The shorter height helps ensure that it can fit in the space between the carrier bar 30 and the well head. In this case, the well head includes a known stuffing box 80, including a nut 82 that, when turned in a tightening direction, tightens the stuffing of the stuffing box 80 against the polish rod so as to make a seal, in order to prevent oil from coming out of the top of the well head instead of going through the piping (not depicted) that forms the desired flow path of the oil. The stuffing box 80 rests on top of the well casing 70. The half-clamp assembly 10' may be used to provide a back-up in case the clamp assembly 10 fails.

While the invention has been described in conjunction with the specific embodiments described above, these embodiments should be viewed as illustrative and not limiting. Various changes, substitutes, improvements or the like are possible within the spirit and scope of the invention.

What is claimed is:

1. A clamp assembly for supporting a rod, comprising:
a housing comprising (i) a base including a first corner and a second corner, (ii) a first wing extending from the first corner, (iii) a second wing extending from the second corner, (iv) a first lip connected to the first wing, the first lip not being parallel to the first corner, and (v) a second lip connected to the second wing along a front corner of the second wing, the second lip not being parallel to the second corner, free ends of the lips facing toward each other such that a rod-receiving slot is defined between the free ends of the lips, the rod-receiving slot being sized to allow the rod to pass laterally through the rod-receiving slot;
a door that engages with the lips, the housing and door being shaped such that downward movement of the door with respect to the housing causes the door to be forced closer to the base of the housing; and
a rod-contact member attached to the door, the rod-contact member being detachable from the door, the rod-contact member in use being in contact with the rod.

2. The clamp assembly according to claim 1, wherein the rod-contact member is of a different material from that of the door.

3. The clamp assembly according to claim 1, wherein the base is concave in an inward-facing direction.

4. The clamp assembly according to claim 1, further comprising a door retainer clamp that is operable to drive the door downward with respect to the housing and retain the door from moving upward.

5. An assembly, comprising
a plurality of clamp assemblies according to claim 1, attached to a single rod such that one end of one of the clamp assemblies is adjacent to an end of another of the clamp assemblies.

6. A clamp assembly for supporting a rod, comprising:
a housing comprising (i) a base including a first corner and a second corner, (ii) a first wing extending from the first corner, (iii) a second wing extending from the second corner, (iv) a first lip connected to the first wing, the first lip not being parallel to the first corner, and (v) a second lip connected to the second wing along a front corner of the second wing, the second lip not being parallel to the second corner, free ends of the lips facing toward each other such that a rod-receiving slot is defined between the free ends of the lips, the rod-receiving slot being sized to allow the rod to pass laterally through the rod-receiving slot;
a door that engages with the lips, the housing and door being shaped such that downward movement of the door with respect to the housing causes the door to be forced closer to the base of the housing; and
a rod-contact member attached to the door, the rod-contact member being of a material having a lower hardness than a material of the door, the rod-contact member in use being in contact with the rod.

7. The clamp assembly according to claim 6, further comprising a door retainer clamp that is operable to drive the door downward with respect to the housing and retain the door from moving upward.

8. An assembly, comprising
a plurality of clamp assemblies according to claim 6, attached to a single rod such that one end of one of the clamp assemblies is adjacent to an end of another of the clamp assemblies.

9. A clamp assembly for supporting a rod, comprising:
a housing comprising (i) a base including a first corner and a second corner, (ii) a first wing extending from the first corner, (iii) a second wing extending from the second corner, (iv) a first lip connected to the first wing, the first lip not being parallel to the first corner, and (v) a second lip connected to the second wing along a front corner of the second wing, the second lip not being parallel to the second corner, free ends of the lips facing toward each other such that a rod-receiving slot is defined between the free ends of the lips, the rod-receiving slot being sized to allow the rod to pass laterally through the rod-receiving slot;
a door that engages with the lips, the housing and door being shaped such that downward movement of the door with respect to the housing causes the door to be forced closer to the base of the housing;
a rod-contact member attached to the door, the rod-contact member in use being in contact with the rod; and
a door retainer clamp that is operable to drive the door downward with respect to the housing and retain the door from moving upward.

10. An assembly, comprising
a plurality of clamp assemblies according to claim 9, attached to a single rod such that one end of one of the clamp assemblies is adjacent to an end of another of the clamp assemblies.

11. The clamp assembly according to claim 9, wherein the rod-contact member has a wedge shape.

12. A combination, comprising:
an oil well pumping rig including a polish rod; and
the clamp assembly according to claim 9, attached to the polish rod.

13. The clamp assembly according to claim 6, wherein the rod-contact member has a wedge shape.

14. A combination, comprising:
an oil well pumping rig including a polish rod; and
the clamp assembly according to claim 6, attached to the polish rod.

15. The clamp assembly according to claim 1, wherein the rod-contact member has a wedge shape.

16. A combination, comprising:
an oil well pumping rig including a polish rod; and
the clamp assembly according to claim 1, attached to the polish rod.

17. The clamp assembly according to claim 9, wherein the door retainer clamp comprises a bolt and nut.

18. The clamp assembly according to claim 7, wherein the door retainer clamp comprises a bolt and nut.

19. The clamp assembly according to claim 4, wherein the door retainer clamp comprises a bolt and nut.

* * * * *